FREQUENCY MULTIPLIER CIRCUIT

Filed April 16, 1948

Inventor:
Henry P. Thomas,
by Merton D Morse
His Attorney.

Patented Jan. 29, 1952 2,583,801

UNITED STATES PATENT OFFICE 2,583,801

FREQUENCY MULTIPLIER CIRCUIT

Henry P. Thomas, Fayetteville, N. Y., assignor to General Electric Company, a corporation of New York Application April 16, 1948, Serial No. 21,439

5 Claims. (Cl. 250—36)

This invention relates to circuits for multiplying the frequency of electric oscillations by generating currents or voltages whose frequency is a definite integral multiple of the frequency of some given source.

In the usual frequency multiplication circuits known in the art, there is always a certain proportion of the fundamental frequency transmitted through the stage along with the desired harmonic frequency. In many applications, and more particularly in frequency modulation equipment, any residual fundamental frequency current is very objectionable as it will react on the modulating currents to produce side frequencies in the output signal which may cause interference on adjacent channels.

The principal object of this invention is to provide a new and improved circuit for reducing, to an insignificant level, the fundamental frequency component that will be transmitted through the stage following a harmonic multiplier.

A further object of this invention is to provide such a circuit through the combination of a few simple and relatively inexpensive elements, and thus eliminate the necessity for complicated filter networks.

Very briefly, these objects are accomplished by inserting in series with the biasing resistance in the control grid circuit of a harmonic amplifier which is drawing grid current, a corrective circuit comprising a parallel capacitance and inductance, resonant at the fundamental frequency component whose rejection is desired.

For additional objects and advantages and for a better understanding of the invention, attention is now directed to the following description and accompanying drawings, and also to the appended claims in which the features of the invention believed to be novel are particularly pointed out.

Figure 1:
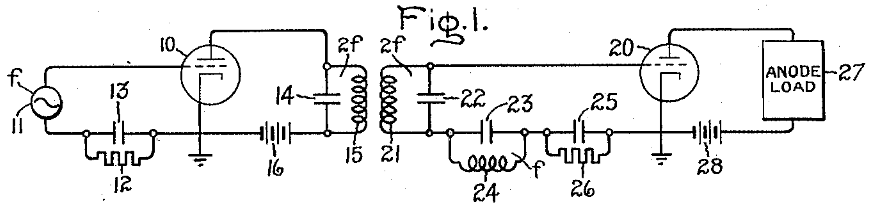
Fig. 1 is a schematic illustration of a circuit embodying the invention of which the principal components are a harmonic multiplier valve, an amplifier valve and a corrective circuit.

Referring now particularly to Fig. 1 of the drawings, there is shown an electron discharge device or valve 10 operating as a harmonic multiplier. To simplify the analysis of operation, it is represented as a frequency doubler, although it will be understood that it may provide an output frequency which is any suitable integral multiple of the input frequency. A source 11, of input frequency $f$, connected in series with a biasing resistance 12 and by-pass capacitance 13 in parallel, is connected between the control grid and the cathode of device 10. The anode load for valve 10 is provided by inductance 15 and capacitance 14 in parallel, tuned to resonance at the second harmonic frequency $2f$. A suitable source of anode operating potential is represented conventionally by battery 16.

The amplifier valve 20 is provided with grid excitation from an input circuit comprising inductance 21 and condenser 22, tuned to resonance at the harmonic frequency $2f$, inductance 21 being magnetically coupled to inductance 15 of the multiplier valve anode load. The input circuit is completed through an inductance 24 and capacitance 23, constituting a parallel circuit resonant at the fundamental frequency $f$, in series with the impedance of self-biasing resistor 26 and by-pass condenser 25, to the cathode which is grounded. The anode load impedance and operating potential source for amplifier valve 20 are represented conventionally by block 27 and battery 28 respectively.

Figure 2:
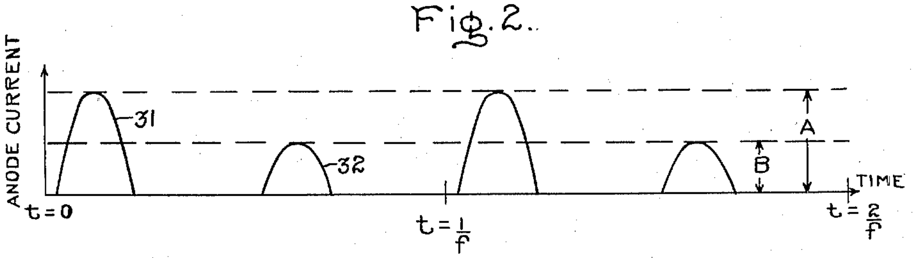
Fig. 2 is a rectilinear co-ordinate diagram of the plate current waveform of the multiplier valve.

In the rectilinear co-ordinate diagram of Fig. 2, the anode current of multiplier valve 10 is shown for the case when the input frequency is $f$ and the output load is tuned to a frequency $2f$. The abscissae represent time measured from some reference instant, and the ordinates represent the magnitude of the anode current. The plate current occurs in discontinuous positive pulses 31 and 32, alternately of greater magnitude A, and of lesser magnitude B, one of each occurring over a single period $$\frac{1}{f}$$

of the fundamental frequency.

Figure 3:
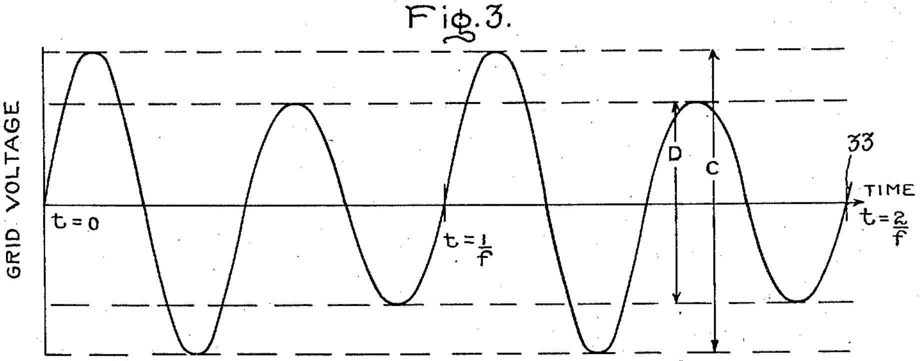
Fig. 3 is a rectilinear co-ordinate diagram of the grid voltage waveform of the amplifier valve.

In the rectilinear co-ordinate diagram of Fig. 3, the voltage actively existing across the parallel circuit of inductance 21 and capacitance 22 is represented by curve 33. This voltage would be effectively applied to the control grid of valve 20 in the absence of the corrective circuit. It consists of alternate cycles of greater and lesser peak magnitudes C and D respectively. The actual voltage wave shown is that of a carrier at frequency $2f$, amplitude modulated at a frequency $f$ with a modulation factor of $$\frac{1}{4}$$

This wave may be expressed by the following mathematical relationship:

$$e=E_0\left(1+\frac{1}{4}\sin 2\pi ft\right)\sin 4\pi ft$$

where $e$=instantaneous voltage at instant $t$,
$E_0$=maximum amplitude of the unmodulated carrier,
$f$=frequency of the modulation voltage,
$2f$=frequency of the carrier voltage.

This mathematical relationship can be resolved into the following:

$$e=E_0\cdot\sin 4\pi ft+\frac{E_0}{8}\cdot\cos 2\pi ft-\frac{E_0}{8}\cdot\cos 6\pi ft$$

showing that the modulated voltage wave actually consists of a fundamental frequency component $2f$ with sideband frequencies $f$ and $3f$.

Figures 4, 5:
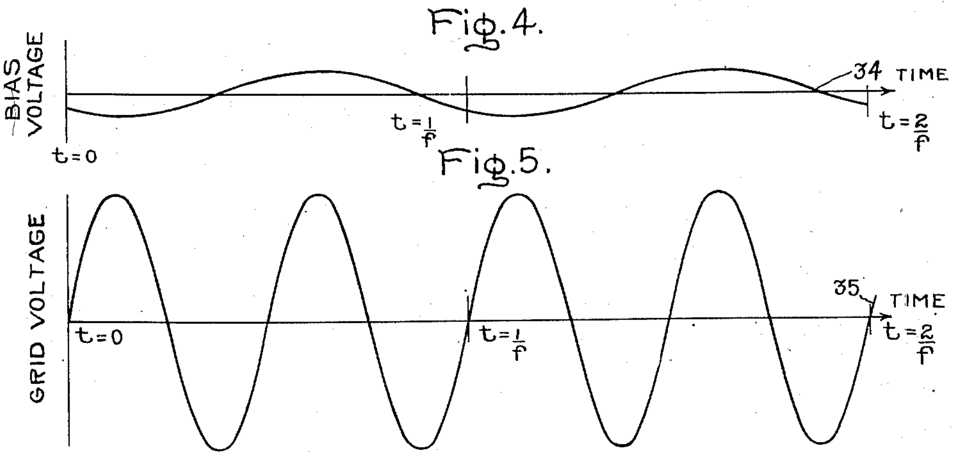
Fig. 4 is a rectilinear co-ordinate diagram of the voltage waveform across the corrective circuit.
Fig. 5 is a rectilinear co-ordinate diagram of the grid voltage waveform effective at the amplifier valve, taking into account the action of the corrective circuit. The diagrams of Figs. 2–5 are arranged with their abscissae along a common time axis to facilitate comparison.

In the rectilinear co-ordinate diagram of Fig. 4, the voltage developed across the corrective circuit, consisting of inductance 24 and capacitance 23 in parallel, is represented by curve 34. It consists of a voltage of frequency $f$ of phase opposite to that of the modulating component of the grid voltage in Fig. 3.

In the rectilinear co-ordinate diagram of Fig. 5 the voltage effectively applied to the grid of amplifier valve 20, when the original modulated voltage of Fig. 3 is applied to the grid of valve 20 in conjunction with the corrective voltage of Fig. 4, is represented by curve 35. This voltage wave is a simple sinusoidal function of frequency $2f$.

In the operation of the complete circuit, valve 10 acts as a frequency doubler with the plate current flowing in pulses of alternately greater and lesser magnitude as illustrated in Fig. 2. This causes a voltage to be developed across the input circuit of amplifier valve 20 which would normally be a wave such as illustrated in Fig. 3. This wave is fundamentally of frequency $2f$ but is modulated at the original frequency $f$. Valve 20 is operated so that grid current flows during part of the positive half cycles of the input voltage. This grid current again consists of a fundamental frequency $2f$ modulated at frequency $f$. By tuning the parallel resonant circuit 23—24 to frequency $f$, the component of grid current of this frequency generates a voltage across the resonant circuit 23—24 of such phase as to oppose the modulation already present. This results in effectively applying at the grid of valve 20 a voltage wave of frequency $2f$ from which the modulation by a frequency $f$ has been eliminated.

The action of the anti-resonant circuit 23—24 is not the same as that of the usual trap circuit in that it depends for its action on the fact that the input circuit of the succeeding valve is driven positive so that grid current flows. This means that the anti-resonant impedance of the circuit needs to be large in comparison with the grid impedance of the valve only during the portion of the cycle when it is drawing current and not in comparison with the average input impedance.

This makes it possible for a circuit of small physical size, having a comparatively low ratio of impedance to high frequency resistance, to be highly effective in eliminating the undesired frequencies.

This circuit can be employed with any harmonic multiplier and is not restricted to a harmonic doubler. Also, the stage into the input of which the corrective circuit is introduced need not be an amplifier but may also be a harmonic multiplier, and the only requirement is that it be of a type where grid current flows during part of the cycle.

While a specific embodiment has been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. In a frequency multiplier circuit, an electron discharge device having input, output and common electrodes, an input circuit connected between said input and common electrodes and energized from a source of oscillations of frequency $nf$ mixed with an undesired $f$, $n$ being an integer, said input circuit comprising an anti-resonant circuit in series with a biasing impedance, an output load circuit connected between said output and common electrodes, means for impressing positive operating potential on said output electrode, said device being adjusted so that said input electrode draws current through said input circuit during part of each cycle of said oscillations, said anti-resonant circuit being tuned to said undesired frequency $f$, thereby to cause a voltage of frequency $f$ to be developed across said anti-resonant circuit whereby oscillations of frequency $nf$ and substantially free of frequency $f$ appear in said output circuit.

2. In a frequency multiplier circuit, an electron discharge device having an anode, cathode and grid, an input circuit connected between said grid and cathode, means for energizing said input circuit from a generator developing a voltage of a frequency mixed with an undesired frequency, an output load circuit connected between said anode and cathode, and means for impressing positive operating potential on said anode, said input circuit including an inductance and capacitance in parallel in series with a biasing impedance, said device being adjusted so that grid current flows through said input circuit during part of the input cycle, and said inductance and capacitance in parallel being tuned to the undesired frequency, thereby to cause a voltage of that frequency to be generated in said input circuit which substantially opposes the voltage of said undesired frequency.

3. A frequency multiplier circuit comprising two electron discharge devices in cascade, means for impressing anode operating potential on each of said devices, the first of said electron discharge devices having its input circuit energized from a source of fundamental frequency and its output circuit connected to the primary of a transformer, the second of said electron discharge devices having grid and cathode terminals connected through the secondary of said transformer, said grid-to-cathode connection being made through a series circuit comprising a resistance and a first capacitance in parallel, in series with an inductance and a second capacitance in parallel, said inductance and second capacitance being anti-resonant to said fundamental frequency and both primary and secondary circuits of said transformer being tuned to resonance at a harmonic of said fundamental frequency, means comprising said resistance and first capacitance for biasing said grid of said second electron discharge device so that grid current flows through said input circuit during part of the input cycle.

4. In an electronic frequency multiplier comprising a harmonic multiplying device, an amplifying device, a coupling network tuned to a harmonic frequency, coupling the output of said multiplying device to the input of said amplifying device, means for impressing anode operating potential on each of said devices, said amplifying device being adjusted so that grid current flows during part of the harmonic input cycle, means comprising a self-bias resistance connected in said coupling network to develop a biasing voltage for said amplifying device in response to said grid current, and a parallel circuit of inductance and capacitance also connected in said network in series with said resistance, said parallel circuit being anti-resonant at the fundamental frequency of said harmonic frequency.

5. In a frequency multiplying system comprising a harmonic generator having a desired output frequency equal to $n$ times a fundamental frequency $f$, $n$ being an integer, said output frequency being undesirably mixed with a signal of frequency $f$, an amplifier having a control grid circuit energized from said generator and an output load circuit, said grid circuit including a self-bias impedance in series with a parallel resonant circuit tuned to frequency $f$, said amplifier and self-bias impedance being adjusted to cause grid current to flow in said input circuit during at least a portion of each cycle of oscillations at the applied frequency $nf$, whereby said oscillations are mixed with a voltage of frequency $f$ developed across said resonant circuit in opposing phase to said undesired signal of frequency $f$.

HENRY P. THOMAS.

REFERENCES CITED

The following references are of record in the file of this patent:

UNITED STATES PATENTS

| Number | Name | Date |
|---|---|---|
| 1,982,916 | Kummerer | Dec. 4, 1934 |
| 2,013,806 | Osnos | Sept. 10, 1935 |
| 2,289,822 | Boucke | July 14, 1942 |
| 2,356,308 | Fredendall | Aug. 22, 1944 |